United States Patent [19]

Marcy

[11] 4,280,105
[45] Jul. 21, 1981

[54] LASER GAS TEMPERATURE CONTROL AND SPACIAL EQUALIZER

[75] Inventor: Robert D. Marcy, Chatsworth, Calif.

[73] Assignee: The United States of America as represented by the Secretary of the Air Force, Washington, D.C.

[21] Appl. No.: 6,840

[22] Filed: Jan. 26, 1979

[51] Int. Cl.³ .................. H01S 3/045; H01S 3/095
[52] U.S. Cl. ............................ 331/94.5 P; 331/94.5 D
[58] Field of Search ............... 331/94.5 G, 94.5 P, 331/94.5 D, 94.5 T, 94.5 S; 165/105, 106, 107 R, 107 D, 108; 65/115, 118

[56] References Cited

U.S. PATENT DOCUMENTS

| | | | |
|---|---|---|---|
| 3,886,475 | 5/1975 | Pinsley | 331/94.5 P |
| 4,015,439 | 4/1977 | Stern | 62/115 X |

*Primary Examiner*—James W. Davie

*Attorney, Agent, or Firm*—Donald J. Singer; Casimer K. Salys

[57] ABSTRACT

A system for substantially eliminating undesirable temperature transients and spacial gradients in the laser gas flow through a laser cavity having a large system heat exchanger positioned upstream of the cavity which provides an exit gas temperature $T_i$ approximately 5 degrees above the desired cavity inlet temperature wherein the large heat exchanger has a time dependent tolerance of ±5 degrees. A trimmer heat exchanger is positioned between the large heat exchanger and the cavity. A flow of saturated liquid coolant through the trimmer heat exchanger from a tank is provided by a constant displacement pump, with the flow rate of the coolant set to remove a maximum heat load corresponding to a 10 degrees temperature drop in the gas flow through the trimmer heat exchanger. The saturated liquid temperature and pressure of the liquid in the tank is adjusted to the desired level by controlling the pressure in the tank with an absolute pressure regulator.

3 Claims, 2 Drawing Figures

LASER GAS TEMPERATURE CONTROL AND SPACIAL EQUALIZER

RIGHTS OF THE GOVERNMENT

The invention described herein may be manufactured and used by or for the Government of the United States for all governmental purposes without the payment of any royalty.

BACKGROUND OF THE INVENTION

This invention relates to a temperature control system for laser gas.

Large sensible heat absorption type heat exchangers have large coolant temperature gradients. Multiple passes can reduce spacial temperature gradients at the heat exchanger exit but cannot eliminate them.

Prior to start up in a laser system, the gas temperature throughout the system, as well as at the duct walls in the vicinity of the cavity, differ from the desired cavity inlet temperature. This results in a temperature transient at the cavity inlet, following start up and laser initiation, and a thermal gradient close to the nozzle walls.

Spacial temperature distortion at the laser entrance results in density gradients normal to the flow which degrades laser performance.

BRIEF SUMMARY OF THE INVENTION

According to this invention, a large system heat exchanger, positioned upstream of the laser inlet, is designed to provide a gas temperature $T_i$ approximately 5 degrees above the desired laser inlet temperature $T_o$, with a time dependent tolerance of $\pm 5$ degrees. A temperature trim control and spacial equalizer heat exchanger is positioned between the large heat exchanger and the laser inlet nozzle. The trim control heat exchanger is a boiling liquid heat exchanger which has high effectiveness so that the exit gas temperature $T_o$ is very close to the coolant temperature $T_t$ and substantially independent of the gas inlet temperature $T_i$.

A coolant such as liquid ammonia, $NH_3$, is supplied to the boiling liquid heat exchanger from a tank by means of a constant displacement pump which provides a fixed flow-rate of saturated $NH_3$ to the trimmer heat exchanger. A pressure regulator is provided to maintain the coolant in the tank at a predetermined saturated pressure and temperature. The coolant flow rate is set to remove the maximum heat load corresponding to a 10 degrees temperature drop with a coolant exit quality of 80%. When the coolant is returned to the tank the liquid portion of the two-phase fluid will re-mix with the saturated liquid in the tank to be reused.

IN THE DRAWINGS

DETAILED DESCRIPTION OF THE INVENTION

Figure 1:
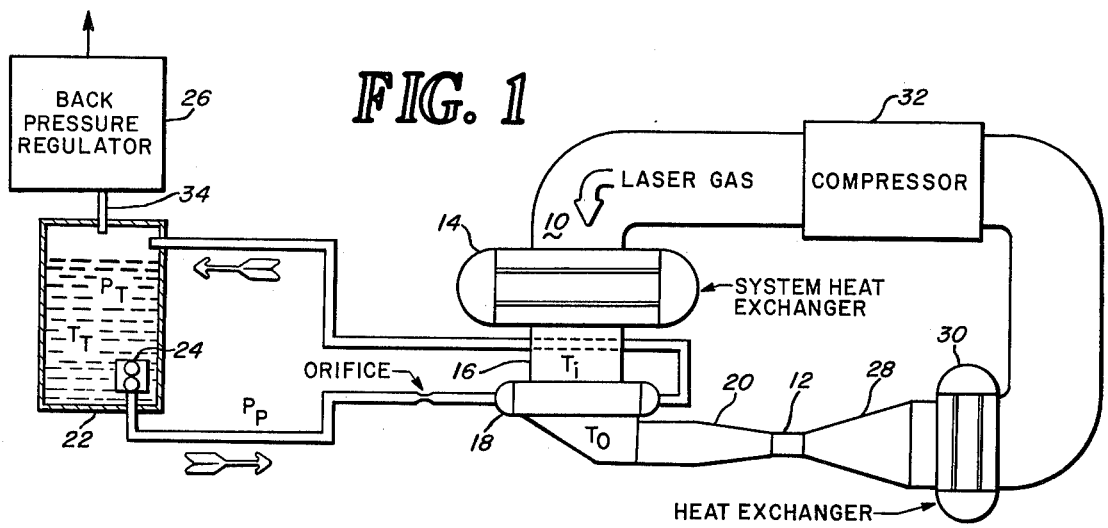
FIG. 1 is a schematic diagram of a laser gas cooling system according to the invention.

Reference is now made to FIG. 1 of the drawing wherein a conventional laser gas in channel 10 is supplied to a laser cavity indicated schematically at 12.

To eliminate undesirable temperature transients and spacial gradients in the gas flow in the laser cavity 12, a large heat exchanger 14 is designed to provide the gas in channel 16 with a temperature $T_i$ about 5 degrees above the desired laser inlet temperature $T_o$, with a time dependent tolerance of $\pm 5$ degrees.

A trimmer heat exchanger 18 is provided between the heat exchanger 14 and the laser inlet nozzle 20.

Saturated liquid ammonia is supplied to the heat exchanger 18 from a tank 22 by means of a constant displacement pump 24. The pressure in tank 22 is controlled by a back pressure regulator 26. The back pressure regulator 26 may be conventional ammonia compatible back pressure regulator which will operate in the particular temperature and pressure range of interest for the particular laser system.

For example to provide a temperature $T_o = 458°$ R., the heat exchanger 14 would be designed to provide an exit temperature $T_i = 463°$ R. $\pm 5$ degrees. The heat exchanger 18 would then have to remove a maximum heat load corresponding to a 10 degree temperature drop. Due to the small heat load for the trimmer heat exchanger, the trimmer heat exchanger can be made to provide an exit gas temperature very close to the saturated liquid coolant temperature within the tank 22.

Figure 2:
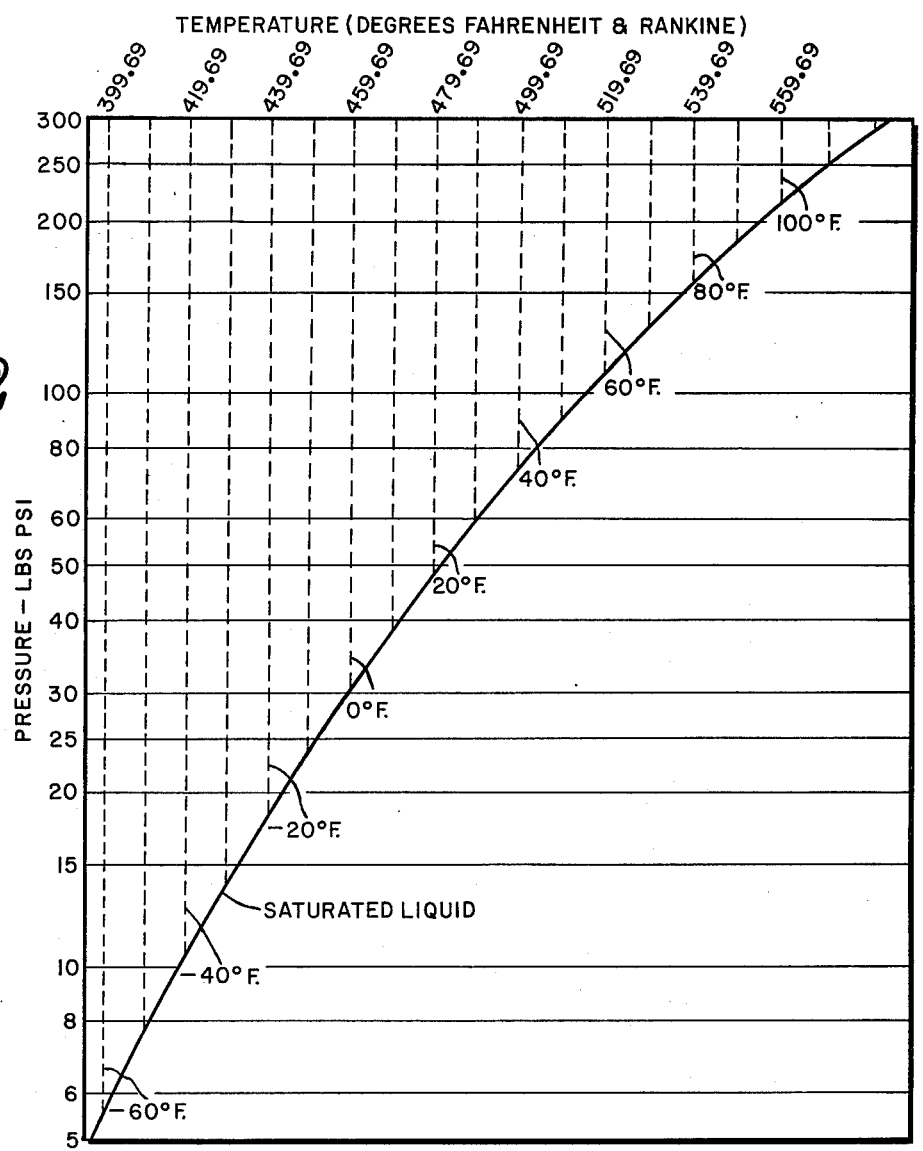
FIG. 2 shows a temperature-pressure liquid-vapor phase diagram for ammonia.

As can be seen from the "Mollier Chart of Properties of Ammonia", shown in the Bureau of Standards Circular 142, dated Apr. 16, 1923 (printed 1945), a portion of which is reproduced in FIG. 2, the saturated liquid temperature can be controlled by controlling the pressure within the tank. The chart in FIG. 2 has been modified to also indicate temperature in degrees Rankine.

With the tank pressure maintained at approximately 29.0 psia, the saturated liquid temperature for the ammonia will be approximately 457° R. A coolant flow rate of 0.085 gallons per minute for each lb/sec of gas flow rate will remove the maximum heat load corresponding to a 10 degree temperature drop with an exit quality of 80%. As the heat load is reduced, less liquid will be converted to vapor, and the quality of the heat exchanger exit coolant will reduce as it flows back to the tank 22. The liquid portion of the two phase liquid will re-mix with the saturated liquid in tank 22 to be reused. Laser gas passing through the heat exchanger 18 will exit with a spacially uniform temperature due to the nearly constant metal temperature in the heat exchanger and a lack of sensitivity to heat transfer variations.

While ammonia has been described as the coolant used in the trimmer heat exchanger, other coolants such as ethylene or liquid nitrogen may be used for certain applications.

In the operation of the device, laser gas in the output of laser cavity 12, after passing through the diffuser 28 will normally be cooled in a heat exchanger 30 and passed through a compressor 32 and will then be supplied to channel 10. The laser gas in channel 10 is cooled to a temperature $T_i$ approximately 5 degrees above the trimmer heat exchanger 18, exit temperature $T_o$, with a time dependent tolerance of $\pm 5$ degrees.

The pressure regulator 26 is adjusted to provide a saturated liquid temperature in the tank 22 slightly below the desired trimmer heat exchanger exit temperature $T_o$. The constant displacement pump 24 is set to provide a coolant flow rate selected to remove the maximum heat load corresponding to a 10 degree temperature drop. The coolant from the heat exchanger 18 is returned to the tank 22 where the liquid is remixed with the liquid in the tank for re-use. A portion of the coolant vapor excapes through the vapor vent line 34 and the regulator 26 to maintain the tank pressure at the desired value.

There is thus provided a temperature control system for laser gas which substantially eliminates undesirable temperature transients and spacial temperature gradients in the laser gas flow through a laser cavity.

I claim:

1. In a laser system including a laser cavity with means for supplying a flow of laser gas through said cavity; apparatus for providing a substantially uniform laser gas inlet temperature $T_o$, without temperature transients and spacial temperature gradients at the laser inlet nozzle of the flow through the cavity, comprising: a first, large capacity, heat exchanger, upstream of said laser cavity, for providing a heat exchanger exit temperature $T_i$, with a nominal time dependent tolerance; a second, boiling liquid, heat exchanger connected in series with the first heat exchanger and positioned between the first heat exchanger and the laser inlet nozzle; a coolant supply tank with supply and return lines from the second heat exchanger for supplying liquid coolant to said second heat exchanger; a back pressure regulator connected to said tank for maintaining the saturated liquid temperature of the coolant slightly below the desired laser inlet temperature $T_o$; and means, providing a coolant flow through said second heat exchanger for removing a maximum heat load corresponding to the tolerance of said first heat exchanger while maintaining boiling liquid operation of the second heat exchanger.

2. The device recited in claim 1, wherein said means for providing a coolant flow comprises a constant displacement pump.

3. The device as recited in claim 2 wherein said coolant is saturated liquid ammonia.

* * * * *